Jan. 21, 1964 R. DAUB 3,118,712
PISTON WITH REINFORCED PISTON RING GROOVES
Filed May 5, 1961 4 Sheets-Sheet 1
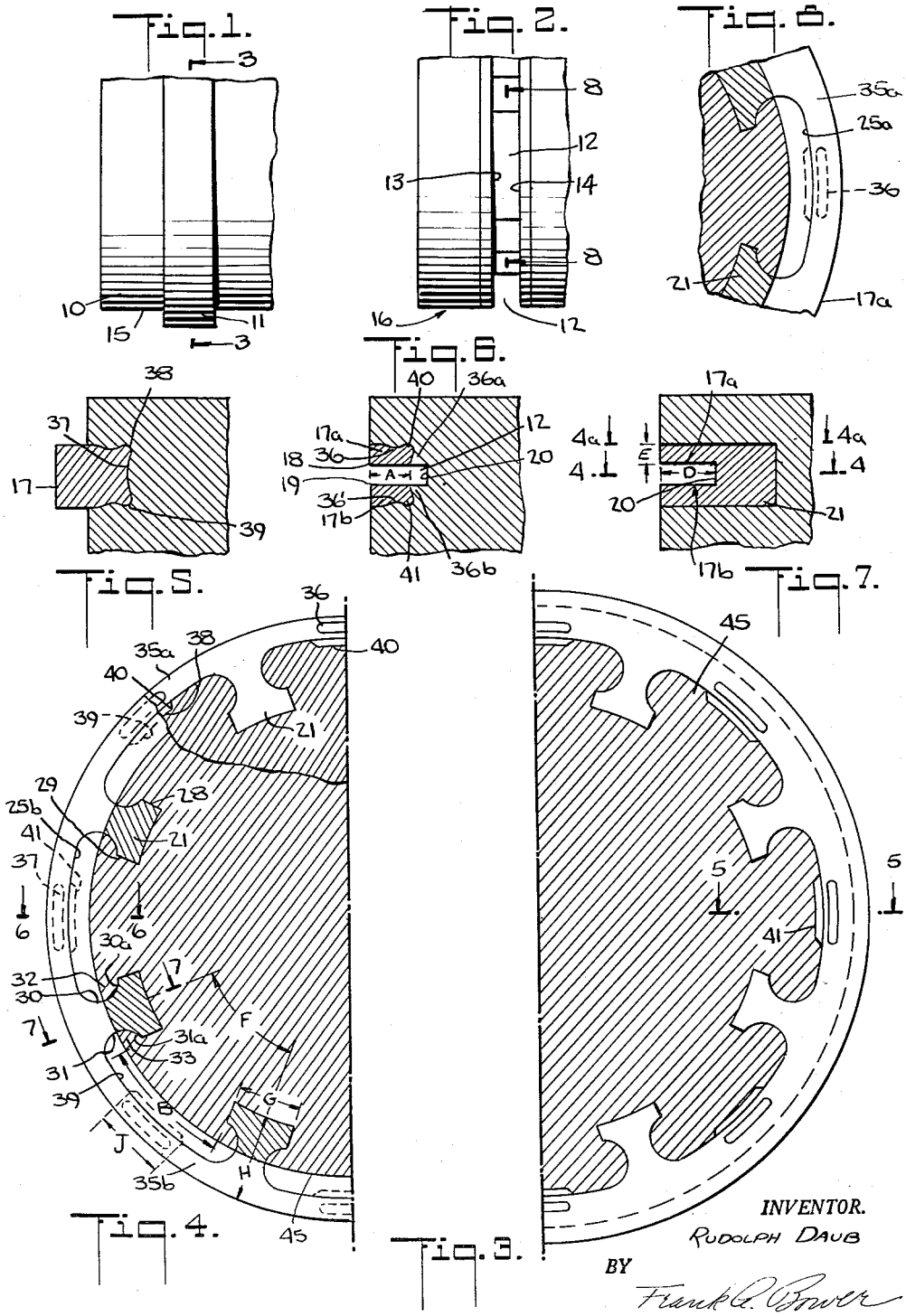
INVENTOR.
RUDOLPH DAUB
BY
Frank A. Bower
ATTORNEY

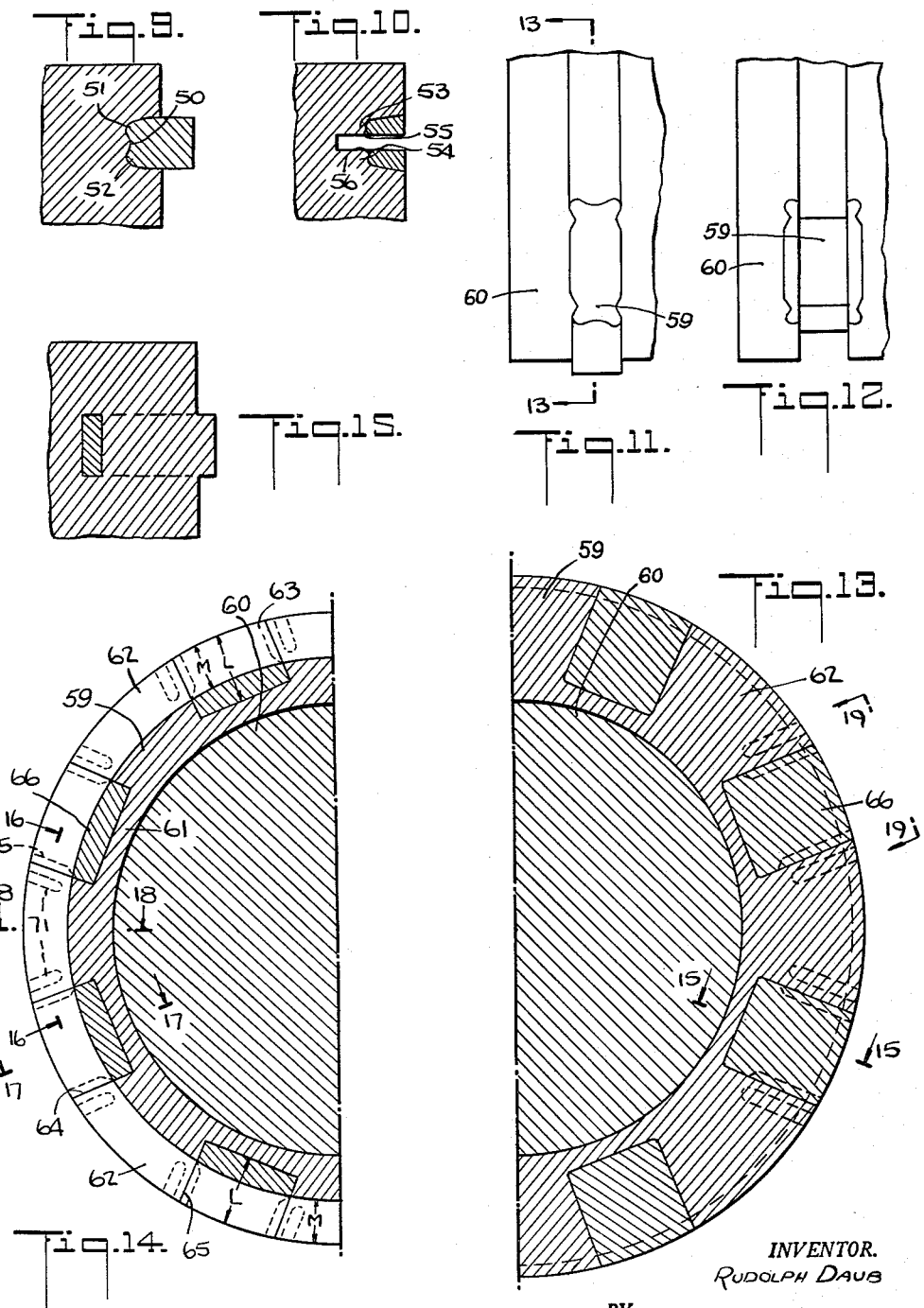

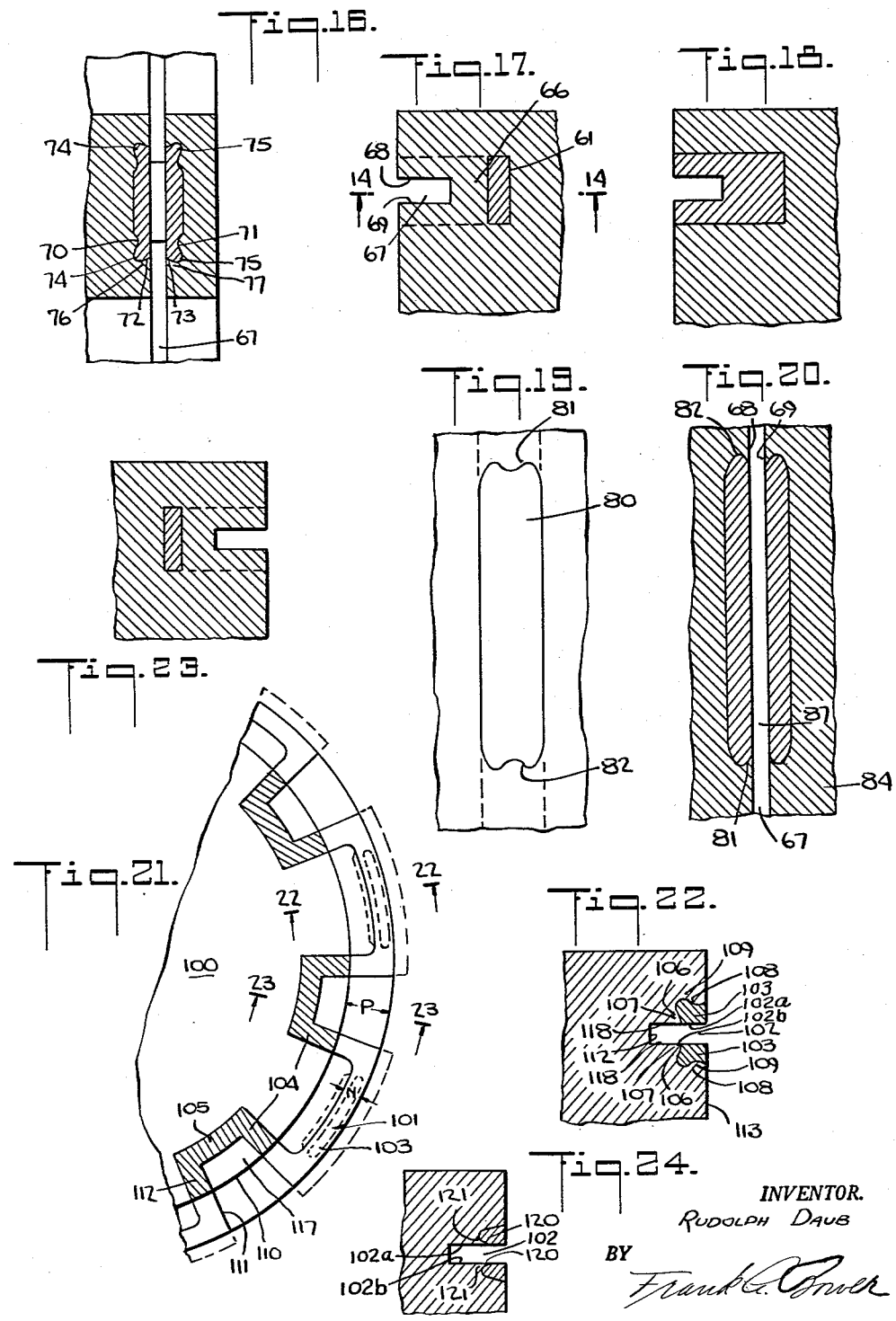

Jan. 21, 1964 R. DAUB 3,118,712
PISTON WITH REINFORCED PISTON RING GROOVES
Filed May 5, 1961 4 Sheets-Sheet 4

INVENTOR.
RUDOLPH DAUB
BY
Frank G. Bower
ATTORNEY

United States Patent Office 3,118,712
Patented Jan. 21, 1964

3,118,712
PISTON WITH REINFORCED PISTON RING
GROOVES
Rudolph Daub, Box 106, North Caldwell, N.J.
Filed May 5, 1961, Ser. No. 108,172
6 Claims. (Cl. 277—189.5)

This invention relates to pistons for internal combustion engines and particularly to the reinforcement or formation of wear-resistant piston ring groove surfaces in pistons made of aluminum or aluminum alloys or other material losing strength and hardness on increase in temperature.

The manufacture of internal combustion engines with high compression ratios has necessitated the use of pistons made of aluminum or aluminum alloys in order to obtain a high conductivity of heat across the dome of the piston and downward to the lower portions of the piston. These pistons have the shortcoming that the piston ring groove walls deform under the heavy repetitive impact of the piston ring thereby shortening the life of the piston and requiring the overhaul of the engine and replacement of the pistons. Many successful means have been provided to reinforce the walls of the piston ring groove surfaces of aluminum and aluminum alloy pistons. These may be separated into two classes. In one class a single reinforcing ring is provided to form the upper and lower surfaces of the piston ring groove. In the other class separate pieces are used to reinforce the upper and lower surfaces. This latter class is relatively inexpensive means for reinforcing the groove surfaces and in some instances only the upper surface is reinforced. The reinforcement or formation of the upper and lower surfaces by a single insert is still expensive to manufacture. This expense arises primarily in the requirement of an expensive steel that has the same coefficient of expansion as the piston material and a very expensive bonding method. The present invention is directed to providing a single piece insert that is inexpensive and firmly held in the piston.

An object of this invention is to provide pistons of aluminum or aluminum alloy material with single piece reinforcing inserts with a different coefficient of expansion from the piston material that are firmly held in the piston under all conditions of operation for reinforcing the upper and lower piston ring groove surfaces.

Another object of the invention is to provide a strong, elastic single piece insert for forming upper and lower piston ring groove walls that may be fabricated by low cost production methods.

Another object of the invention is to provide a piston with a strong elastic single piece insert forming the upper and lower piston ring groove walls that may be inexpensively fabricated by stamping and coining operations.

Another object of the invention is to provide aluminum or aluminum alloy pistons with reinforcing inserts having means for forming radial, tangential and axial locks with the piston.

Another object of the invention is to provide an aluminum or aluminum alloy piston with an inexpensive single piece insert forming the upper and lower piston ring groove surfaces that has good radial, tangential and axial locking of the insert and a good heat flow between the piston head ring groove lands and piston ring.

Other and further objects of the invention will be apparent from the following description taken in connection with the drawings in which:

FIG. 1 is a fragmentary side view of a cast piston with an insert before machining;

FIG. 2 is a fragmentary side view of a cast piston machined with a piston ring groove;

FIG. 3 is a fragmentary sectional view of the unmachined piston taken along lines 3—3 of FIG. 1;

FIG. 4 is a fragmentary sectional view of the machined piston taken along lines 4—4 and 4a—4a of FIG. 7;

FIG. 5 is a fragmentary sectional view of an unmachined piston taken along lines 5—5 of FIG. 3;

FIG. 6 is a fragmentary sectional view taken along lines 6—6 of FIG. 4;

FIG. 7 is a fragmentary sectional view of the finished piston taken along lines 7—7 of FIG. 4;

FIG. 8 is a fragmentary sectional view taken along lines 8—8 of FIG. 2;

FIG. 9 is a fragmentary sectional view of an unmachined piston illustrating another embodiment of the dovetail bulge portion of the insert;

FIG. 10 is a fragmentary sectional view of a finished piston illustrating the embodiment of FIG. 9;

FIG. 11 is a side view of another form of the insert with a dovetail portion similar to the embodiment of FIG. 1;

FIG. 12 is a fragmentary side view of the finished piston of FIG. 11;

FIG. 13 is a fragmentary sectional view taken along lines 13—13 of FIG. 11;

FIG. 14 is a fragmentary sectional view taken along lines 14—14 of FIG. 17;

FIG. 15 is a fragmentary sectional view taken along lines 15—15 of FIG. 13;

FIG. 16 is a fragmentary sectional view taken along lines 16—16 of FIG. 14;

FIG. 17 is a fragmentary sectional view taken along lines 17—17 of FIG. 14;

FIG. 18 is a fragmentary sectional view taken along lines 18—18 of FIG. 14;

FIG. 19 is a side view of the second form of the dovetail bulge portion on the embodiment of FIG. 13;

FIG. 20 is a sectional view of the second form of the dovetail bulge portion taken along a section similar to the section of FIG. 16;

FIGS. 21, 22 and 23 are fragmentary sectional views taken radially through the piston ring groove of other embodiments of the insert with the first form of the dovetail bulge portion;

FIG. 24 is a fragmentary sectional view taken along a section similar to lines 22—22 of another embodiment of the dovetail bulge;

Figure 25:
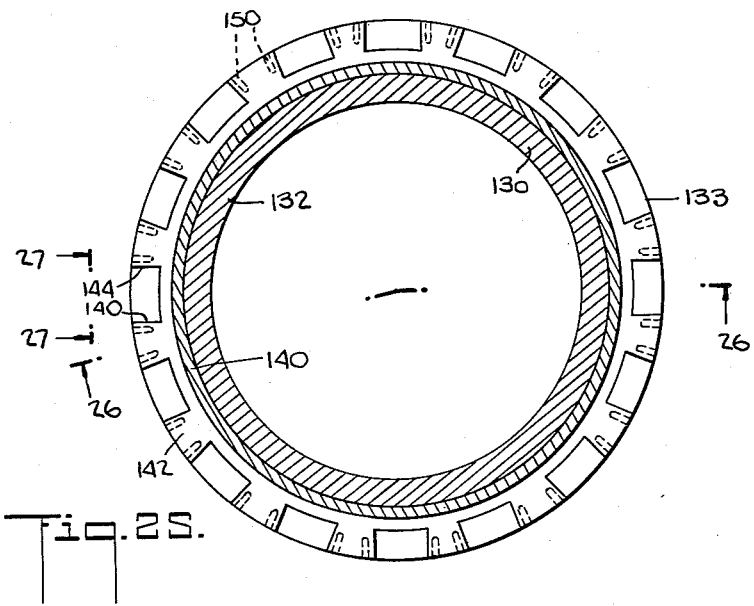
FIG. 25 is a view of another embodiment of the piston sectionally taken along lines 25—25 of FIG. 26.

Referring to FIGS. 1–8 an embodiment of the invention is illustrated which comprises a piston head 10 made of a high heat conductive material such as aluminum or aluminum alloy. In the piston head is a single piece insert 11 forming wear resistant reinforcing means for the piston ring groove 12 in the upper and lower piston ring groove surfaces 13 and 14. The insert is made of metal harder than the piston head material and in this instance the metal is preferably a flexible yieldable steel. In FIG. 1 the unfinished piston is illustrated with an unfinished cylindrical axial extending outer wall 15. The piston is machined to form the smooth precisely finished wall 16 with the piston ring groove 12 extending radially with respect to the central axis of the piston.

The insert has an outer continuous ring portion 17 having an axial thickness greater than the axial width of the groove to extend on each side thereof and forms on machining of the piston an upper continuous ring portion 17a and a lower continuous ring portion 17b. The upper and lower ring portions form continuous outer circumferentially extending outer edges 18 and 19 respectively. The ring portions 17a, 17b spaced from the inner axial wall 20 have a radial width A and extend over an arc B. The wall 20 is spaced radially inward from the edges 18 and 19 to provide the groove with a depth D. Each of the ring portions 17a, 17b has an axial thickness E.

The radial portions are circumferentially spaced and extend radially inward from the ring portions 17a, 17b a distance greater than the depth of the groove 12. The radial portions are preferably evenly spaced and separated over arcs F. The radial portions 21 are formed as a single piece with the ring portions 17a, 17b and connect the upper and lower ring portions together. The piston ring groove forms notches in the radial portions to impart a U-shape to the radial portions. The side edges or surfaces 28, 29 have concave portions 30, 31 with outwardly facing sections 30a, 31a to form radially locking means with the portions 32, 33 of the piston head. The inner ends of the radial portions are circumferentially wider than the reduced portion formed by the concave surfaces. The axial thickness of the inner ends corresponds to the axial width of the insert and is greater than the axial width of the groove 12. The inner ends have a circumferential width G and extend radially inwardly a distance H from the outer surface 16. The concave portions 30, 31 merge with the inner surfaces 25a, b of the ring portions 17a, 17b.

The segments 35a, b of the ring portions 17a, 17b extending between the radial portions are yieldable to the pressures or forces applied by the piston head to the insert. The insert is preferably made of a strong flexible steel that yields to the pressures within the forces of the piston head without the segments rupturing.

Each of the segments is subject to a coining operation to produce depressions or recesses 36, 36' in each segment of the upper and lower ring portions. In the coining operation the inwardly facing walls of the segments are sloped at an angle to the piston ring groove over an arc J to face the piston ring grooves. The piston head has wedge-shaped portions 36a, b between the sloped surfaces and the groove 12. The piston ring groove insert is stamped from sheet steel as a single piece at the time of stamping or by a subsequent forming operation the ring portion of the insert is struck simultaneously on opposite sides by dies with raised bosses corresponding to the recesses. The bosses deform the insert and force the metal radially inward at the top and bottom to impart V-shaped grooves 37 to the inwardly facing walls 25a, b of the segments. The metal of the piston head flows into the grooves 37. The groove is generally symmetrical about the center plane through the insert. On machining of the piston groove the center portion is removed. The piston ring on being positioned in the groove engages the wedge-shaped portions to pound them against the insert and firmly lock the insert in place. This forms a plurality of circumferentially spaced axial locking means around the insert.

In addition to forcing the wall 25a, b into a V-shaped groove the upper and lower edges 38, 39 of the inserts are also forced to bulge from the insert. The piston head material flows around the bulges 40, 41 to form tangential or circumferential locking means with the recesses 36, 36' in cooperation with the radial portions 21. Thus the insert is held radially by the curved sections 30a, 31a and the overlapping segments 32, 33. The inserts are firmly interlocked with the piston head. The steel material is flexible and strong and with the foregoing anchoring the insert remains in the piston head expanding and contracting with the piston head without the rupture of the interlocking means.

The piston head material flows between the radial portions to form overlapping portions 45. The ring portions have a narrow width so that the overlapping portions form good heat conducting paths from the top of the piston head towards the skirt of the piston. Radial locking means are formed by the segments 32, 33 overlapping with the radial portions 21. The overlapping portions 45 form surfaces in the piston ring groove surfaces so that the piston ring groove surfaces are a composite of the insert and piston head material.

In FIGS. 9 and 10 another embodiment of the dovetail bulge portion of the insert is illustrated. The insert is the same as in FIGS. 1–8. The dovetail bulge portions are created by coining the ring portions between two surfaces at an angle. The inner surfaces are squeezed at an angle and a groove 50 is formed in the inside surface having a V-shape. The inner edges of the insert are bulged at 51, 52 to form a tangential lock in cooperation with the radial portions. The piston ring groove is machined as illustrated in FIG. 10. The piston head forms wedge-shaped portions 53, 54 to overlap with the surfaces 55, 56 and axially lock the insert in place.

In FIGS. 11–20 another embodiment of the invention is shown utilizing the two forms of dovetail bulges. In the embodiment illustrated in FIGS. 11–18 the first form is used, in FIGS. 19 and 20 the second form is shown. The insert shown in these figures is a single solid insert having an axial thickness greater than the width of the piston ring groove to be formed and having a radial depth greater than the radial depth of the groove. The insert 59 in the piston head 60 has an inner continuous circumferentially extending ring 61 and outwardly extending radial portions 62. The outwardly extending radial portions are flanked by notches 63 having a radial depth L greater than the depth of the piston ring groove.

The radial portions 62 have side surfaces or edges 64, 65 which are parallel to the radial line bisecting the notches. Thus adjacent edges on radial portions on opposite sides of a notch are parallel. These edges or surfaces extend in a distance L greater than the depth M of the piston ring groove and terminate at the embedded surface 66a joining the inner edges of the generally radially extending surfaces. On the casting of the piston the piston head material flows through the notches to form a piston head portion 66 extending through the insert. The size of the notch insures a free flow of material through the notches and in full contact with the surfaces or edges of the radial portions. On the cooling of the piston the bridging portions 66 which are circumferentially spaced around the piston head grip the inner ring 61 to compress the insert and firmly embed and lock it in the piston head.

On the machining of the piston the piston ring groove 67 is cut through the radial portions and bridging portions a radial distance less than the radial depth of the notches. This forms in the upper and lower piston ring surfaces 68, 69 and in the axial wall alternate surfaces of piston head material and wear resistant metal. The inner ring forms with the bridging portions radial locking means for holding and drawing the insert inward.

The particular feature of this embodiment is the axial and tangential locking of the radial portions. These locking means individually lock the radial portions of the insert in the piston head. As previously described the cutting tool forming the piston ring groove imparts a destructive force. The alternate surfaces of piston head material and wear resistant material presents metals to the tool with different responses to the tool. The insert material is a flexible yieldable steel whereas the aluminum or aluminum alloy is softer. The tool in cutting the wear resistant metal will tend to loosen or disrupt the radial portions. The interlocking of the radial portions and the bridging is accomplished by deforming the radial portions along the edge surfaces. At the time the insert is stamped from a sheet of steel the opposite sides of the radial portions along the edge surfaces is hit by a die to coin the edge surfaces into a V shape with facing surfaces and provide recesses 70, 71 in the upper and lower surfaces of the radial portions. The locking action is the same as described in connection with the embodiment of FIG. 4 except the grooves and surfaces joined by the coining action are in generally the radial direction in contrast to the circumferential direction of the embodiment of FIG. 4. In addition to sloping the edge surfaces 72, 73 to face the piston ring groove and indenting the upper and lower surfaces with recesses the edges of the radial portions also have bulges 74, 75 to radially interlock with the piston head material. Thus the radial portions are axially locked in place by the sloped edge surfaces and the wedge shaped sections 76, 77 of the piston head. The recesses and protruding portion of the piston head form a circumferential lock along with the side edges.

In FIGS. 19 and 20 the radial portions are illustrated with the second form of the dovetailed bulge means. The radial portions 80 have side surfaces 81, 82 sloped to face the piston ring groove 87 in the head 84 and the upper and lower surfaces are sloped to taper the radial portions adjacent each side surface.

In FIGS. 21–24 another form of insert is illustrated and comprises U-shaped pieces 101 embedded in the piston head 100 and interconnected at the inner ends by segments 105 embedded radially inside of the piston ring groove 102. The insert is formed as a single continuous member. Each U-shaped piece has two legs 104 and an outer circumferentially extending portion 103. This portion has a radial width N which is less than the radial depth P of the piston ring groove. This circumferential piece is formed as illustrated with the inner surfaces 106 sloped at an angle to face the piston ring groove 102 and overlap with wedge-shaped portions 107 of the piston head 100 as illustrated in FIG. 22. This forms an axial lock with the piston head. The recesses 108 of the dovetail bulge interfit with the protuberances 109 to form radial locking means. The radial legs 104 at each end circumferentially lock the U-shaped piece. The legs extend axially a distance greater than the width of the piston ring grooves. The grooves form notches in the legs so that the legs form segments of wear resistant material extending radially from the inner axial wall 112 to the outer surface 113 of the piston. The legs also form segments of wear resistant material in the axial surface 113. Thus at circumferentially spaced points continuous wear-resistant surface portions are provided. The outer portions of the legs and the circumferential pieces form the reinforcing wear-resistant surfaces in the piston ring groove surfaces 102a, 102b. Thus the piston ring groove surfaces are a composite of piston head metal and wear resistant metal. The circumferential piece 103 also forms segments of the outer edges of the piston ring groove to reinforce the edges and prevent the wear of the edges. The insert is a single piece. The interlocking of the U-shaped pieces is accomplished by the inner portions of the legs and the embedded segments 105. The piston head has bridging portions 117 extending axially to radially lock the embedded segments 105 in the head. On casting this portion is solid and extends to the outer surface. The piston ring groove forms a notch in each portion as is formed in the legs. On the inside of the U-shaped portions the piston head extends between the legs 104 radially to the piece 103 and forms inner portions 118 of the upper and lower surfaces of the piston ring grooves. The wedge-shaped portions 107 are part of these inner extending portions. The insert is made of a resilient steel. The segments and legs form a unitary structure with the circumferential portions of the insert holding the inserts in the piston so as to respond to the variations in size of the piston head. The bridging portions 117 draw the insert inward on cooling and retain the insert in place. The legs permit flexure and the distribution of the pressure to prevent undue stress. Thus the insert may vary radially to adjust the pressure on the insert. The dovetail bulge portions retain the circumferential pieces in place axially and tangentially. The embodiment of FIG. 22 provides good heat paths in the piston head past the insert. The bulging portions 117 and the inner portions 118 provide heat paths from the dome to the lower portions of the piston while cooperating with the insert to form a unitary piston. In FIG. 24 the second form of the dovetail bulge is illustrated with the insert of FIG. 21. The inner surfaces 120 form axial interlocking means with the wedge-shaped portions 121.

Figure 26:
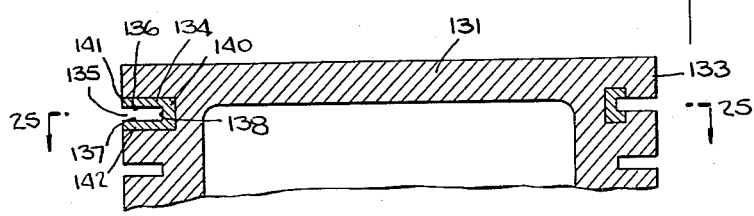
FIG. 26 is a sectional view of the embodiment of FIG. 25 taken along lines 26—26.
Figure 27:
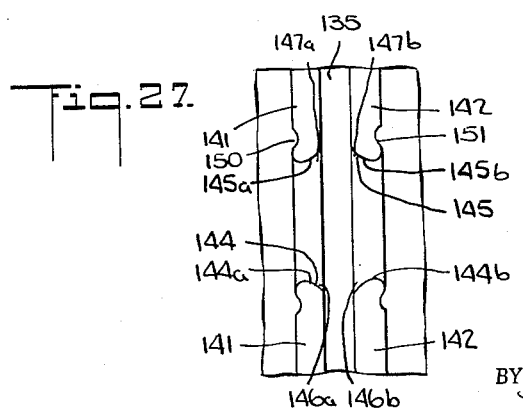
FIG. 27 is a fragmentary side view of the embodiment of FIG. 25 taken along arc 27—27 illustrating the piston ring groove and insert.

Referring to the embodiment of the piston of FIGS. 25–27 a piston 130 of aluminum or aluminum alloy has top piston head wall 131 and an an inner cylindrical wall 132 and an outer cylindrical wall 133. An insert 134 is cast in the piston and a piston ring groove 135 is formed with the insert forming wear resistance surfaces in the piston ring groove surfaces.

The insert 134 is made of material harder than the aluminum or aluminum alloy material of the piston and is preferably a flexible yieldable steel. The insert is a single piece of metal and forms the reinforcing portions of the upper and lower piston ring groove surfaces. The insert comprises an inner circumferentially extending ring portion having an axial thickness greater than the axial width of the groove and an outer diameter greater than the diameter of the inner wall 138 of the piston ring groove. Radial portions 141, 142 extend from the ring portion in planes normal to the axis of the piston and from the ring portion to the outer cylindrical surface 133 of the piston. Thus the upper and lower piston ring groove surfaces have alternate surfaces of aluminum material and steel reinforcing material. The ring portion 140 forms the inner wall 138 and continuous steel surfaces adjacent to the inner axial wall 138 in the upper and lower piston ring surfaces.

The radial portions have edges 144, 145 which are parallel to corresponding edge of an adjacent radial portion to define with the ring portion a notch filled with the aluminum. The parallel relation of the edges forms the edges to be at an angle to the radial plane including the central axis of the piston.

The insert is stamped from sheet steel and the upper and lower radial portions are a single member. With the formation of the piston ring groove by machining each radial portion is formed into an upper and lower radial portion 141, 142. On stamping the insert the radial portions are coined to shape the side surfaces 144, 145 into a V shape or groove so that the surfaces 144 are formed into sloped surfaces 144a, 144b and the surfaces 145 are formed into sloped surfaces 145a, 145b. These latter surfaces are tilted to face the piston ring groove 135. Wedge-shaped portions 146a, b and 147a, b are between the sloped surfaces and the piston ring groove. The upper and lower radial portions are connected as a single piece by the ring portion and locked axially by the wedge-shaped portions. The radial grooves 150, 151 circumferentially lock the radial portions.

The yieldable single piece is anchored or interlocked with the piston at a plurality of points circumferentially distributed around the piston head to anchor the various circumferentially arranged portions of the insert. The insert means comprises a plurality of portions yieldable in relation to one another. In the embodiment of FIG. 1 the outer continuous ring is less than the depth of the piston ring groove.

In the foregoing description a single piece insert forming reinforcing portions of the upper and lower piston ring groove surfaces is set forth. Some of the main features of the insert are that it is manufactured by low cost production methods from a low cost steel and that it is anchored in the piston head material without expensive bonding processes. The physical configuration of the insert in cooperation with the resilient and yieldable characteristics of the metal insert provides a unitary structure with the piston head material for responding to the strains of variations in the heat content of the piston head and the physical impact of the piston ring and combustion forces. One of the most severe conditions imposed on a piston is the wide variation in heat that the piston is subject to within a short period of time such as variations in grades in road transportation. The piston is subjected to excess heat, for example, on an uphill pull and then a subsequent cooling on the level or downgrade. In this latter cooling the aluminum contracts faster than the metal insert causing a substantial force between the insert and the piston head material tending to break the piston head material away from the insert. Also when the piston is in the neighborhood of 500 degrees Fahrenheit the strength of the aluminum in the piston head is substantially reduced and may be one-third its strength at normal temperatures. Thus at these high temperatures the piston head material has less strength to withstand the forces between the insert and piston head material. The present insert has a unitary bond between the various parts of the insert and the piston head material without recourse to using material in the insert having a coefficient of expansion and contraction nearly the same as the piston head material.

The insert is formed to have radial locking means, tangential locking means and axial locking means. The radial locking means provides a firm grip of the piston head material on the insert to draw the insert inwardly on contraction of the piston head. During the casting and cooling of the piston as the aluminum cools off the insert is drawn inwardly reducing its diameter and during operation of the piston in an engine the piston head draws and holds the insert in the head on contracting.

The tangential locking means is provided to prevent dislodgement of the machining of the piston ring groove.

The axial locking means retains the insert in place against the inertia forces of the insert and the pounding of the piston ring as it moves axially in the groove.

The insert has a small axial cross section for high heat transfer from the dome to the skirt of the piston and with the yieldability of the steel permits the insert to readily and rapidly conform to the ever changing diameter of the piston. The yielding of the piston prevents undue strain on the interlocking of the piston and the insert. The reduced cross section of the insert also lightens the insert and lowers the inertia thereby reducing the inertia forces. This permits an increase in the acceleration and deceleration of the piston and consequently a high engine speed and a short piston stroke.

The inserts are inexpensively manufactured by stamping from sheet steel. The axial interlocking means may be formed by a subsequent coining operation either at the stamping position or subsequently. In the case of inserts for larger pistons sold in smaller amounts the inserts may be cast in malleable iron in single disk or as a tube having the desired cross section. Thus the insert is inexpensive to manufacture and is securely related to the piston head.

Various modifications and changes may be made in the embodiment disclosed without departing from the scope of the invention as set forth in the appended claims.

I claim:

1. A piston comprising a piston head of aluminum or aluminum alloy material and having an outer surface and a piston ring groove with upper and lower piston ring groove surfaces, a single piece insert having a continuously solid axial dimension greater than the axial width of the groove and harder than the piston head material, said insert having an inner ring portion located radially inward from said outer surface and having radially extending portions forming reinforcing surfaces in said piston ring groove, said ring portion having an axial thickness greater than the width of the piston ring groove, said radial portions having general radial extending edge surfaces at an angle facing the piston ring groove and wedge-shaped portions between said edge surfaces and said piston ring groove to axially lock said insert in said piston head.

2. A piston comprising a piston head of aluminum or aluminum alloy material and having a piston ring groove with upper and lower piston ring groove surfaces, an insert having a continuously solid axial dimension greater than the axial width of the groove and harder than the piston head material and resilient to yield to the pressures and stresses within the piston head, said insert being formed in a single piece with an axial thickness greater than the axial width of the piston ring groove and positioned to form reinforcing surfaces in the upper and lower piston ring groove surfaces, said insert having radial portions extending radially inward a depth greater than the depth of the piston ring groove and an upper and lower ring portions extending peripherally around said piston, separated by the piston ring groove and connected as a unitary structure by said radial portions, said rings having swaged portions formed by impact to slope the edge surfaces of said rings and said piston head having wedge-shaped portions axially locking said ring portions in said piston head.

3. A piston comprising a piston ring groove with upper and lower piston ring groove surfaces, a single solid piece insert having a continuously solid axial dimension greater than the axial width of the groove and harder than the piston head material, said insert being positioned to form reinforcing surfaces in the upper and lower surfaces and having sloped surfaces facing one another formed by pressing the edges under high impact pressure, said sloped surfaces extending to axially overlap with said piston ring groove, wedge-shaped portions of said piston head between said sloped surfaces and said piston ring groove to axially lock said insert in said piston head.

4. A piston comprising a piston head of aluminum or aluminum alloy metal, a piston ring groove in said head having upper and lower piston ring groove surfaces, an insert having a continuously solid axial dimension greater than the axial width of the groove and harder than the piston head material, said insert having a ring member extending circumferentially and radially within the root diameter of said piston ring groove and formed as a single solid piece having an axial thickness greater than the axial width of the groove, said insert having radial members extending in both the upper and lower piston ring groove surfaces as a unitary piece with said ring member and forming reinforcing surfaces in said piston ring groove surfaces, said radial members having side surfaces extending generally radially, said side surfaces having two portions at an angle and facing one another and said piston ring groove and wedge-shaped portions of said piston head positioned between said piston ring groove surfaces and said side surfaces at an angle to axially lock said radial members in the piston head.

5. A piston comprising a piston head of aluminum or aluminum alloy, a piston ring groove in said head having upper and lower piston ring groove surfaces, an insert having a continuously solid axial dimension greater than the axial width of the groove and harder than the aluminum alloy, said insert formed as a single solid piece and having an axial thickness greater than the axial width of the piston ring groove to form reinforcing surfaces in said upper and lower surfaces from a unitary insert piece, said insert having outer spaced circumferential segments and inner spaced circumferential segments, said segments being connected by radial portions extending from within said piston head to the outer segments, said outer segments having radially inward facing surface coined to form said surface into two portions each at an angle to the axial and facing the piston ring groove, and wedge-shaped portions positioned between said angle portions and said piston ring groove to axially lock said outer segments in said head.

6. In a piston formed of material containing aluminum having an outer cylindrical surface and a circumferentially extending piston ring groove having an upper and lower radially extending piston ring groove surface and an inner annular axially extending wall for holding a piston ring engaging said upper and lower surfaces, a single solid piece insert having a continuously solid axial dimension greater than the axial width of the groove and harder than aluminum extending circumferentially entirely around said piston and having portions extending along the outer surface and in said piston ring groove surfaces to reinforce said surfaces against wear from said piston ring, said portions being formed as part of said single piece insert and having generally axially extending surfaces above and below said piston ring groove with surface portions at an angle to face said piston ring groove on opposite sides thereof and wedge-shaped portions in said piston positioned between said angle surface portions and said piston ring groove to axially lock said insert in said piston.

References Cited in the file of this patent
UNITED STATES PATENTS

| | | |
|---|---|---|
| 2,685,729 | Daub | Aug. 10, 1954 |
| 2,689,773 | Brenneke | Sept. 21, 1954 |
| 2,755,151 | Daub | July 17, 1956 |
| 2,760,834 | Daub | Aug. 28, 1956 |
| 2,776,176 | Daub | Jan. 1, 1957 |
| 2,851,318 | Smith et al. | Sept. 9, 1958 |
| 2,956,847 | Daub | Oct. 18, 1960 |
| 2,990,225 | Bucken et al. | June 27, 1961 |

OTHER REFERENCES

Komm: German application 1,037,201, printed August 21, 1958 (Kl. 46 cl 9).

Schmidt: German application 1,059,712, printed June 18, 1959 (Kl. 46 cl 9).